TAP CHANGING APPARATUS FOR A TRANSFORMER

Filed Nov. 27, 1963

INVENTORS
MASAAKI KAGAWA
AKIRA WATANABE
JUNICHI WATANABE

FIG. 2

| | $K_1$ | $K_2$ | $K_3$ | $K_4$ | $T_0$ | $T_1$ | $T_2$ | $T_{11}$ | $T_{12}$ |
|---|---|---|---|---|---|---|---|---|---|
| 1 | ● | | | | ● | ● | ● | ● | ● |
| 1 a | ● | | | | ● | | ● | ● | ● |
| 1 b | ● | | | | ● | | ● | | |
| 1 c | ● | | | | | | ● | | |
| 1 d | ● | ● | | | | | ● | | |
| 1 e | ● | ● | | | | | ● | ● | ● |
| 2 | ● | ● | | | | ● | ● | ● | ● |
| 2 a | ● | ● | | | | ● | | ● | ● |
| 2 b | ● | ● | | | | ● | | | |
| 2 c | | ● | | | | ● | | | |
| 2 d | | ● | | | ● | ● | | | |
| 2 e | | ● | | | ● | ● | | ● | ● |
| 3 | | ● | | | ● | ● | ● | ● | ● |
| 3 a | | ● | | | ● | ● | | ● | ● |
| 3 b | | ● | | | ● | ● | | | |
| 3 c | | ● | | | | ● | | | |
| 3 d | | ● | ● | | | ● | | | |
| 3 e | | ● | ● | | | ● | | ● | ● |
| 4 | | ● | ● | | | ● | ● | ● | ● |
| 4 a | | ● | ● | | | | ● | ● | ● |
| 4 b | | ● | ● | | | | ● | | |
| 4 c | | | ● | | | | | | |
| 4 d | | | ● | | ● | | ● | | |
| 4 e | | | ● | | ● | | ● | ● | ● |
| 5 | | | ● | | ● | ● | ● | ● | ● |
| 5 a | | | ● | | ● | | ● | ● | ● |
| 5 b | | | ● | | ● | | ● | | |
| 5 c | | | ● | | | | ● | | |
| 5 d | | | ● | ● | | | ● | | |
| 5 e | | | ● | ● | | | ● | ● | ● |
| 6 | | | ● | ● | | ● | ● | ● | ● |
| 6 a | | | ● | ● | | ● | | ● | ● |
| 6 b | | | ● | ● | | ● | | | |
| 6 c | | | | ● | | ● | | | |
| 6 d | | | | ● | ● | ● | | | |
| 6 e | | | | ● | ● | ● | | ● | ● |
| 7 | | | | ● | ● | ● | ● | ● | ● |

Masaaki Kagawa
Akira Watanabe
Junichi Watanabe
INVENTORS

BY George B. Oujevolk
Attorney

TAP CHANGING APPARATUS FOR A TRANSFORMER

Masaaki Kagawa
Akira Watanabe
Junichi Watanabe
INVENTORS

BY George B. Oujevolk
Attorney

Masaaki Kagawa
Akira Watanabe
Junichi Watanabe
INVENTORS
BY George B. Oujevolk
Attorney United States Patent Office 3,308,374
Patented Mar. 7, 1967

3,308,374
TAP CHANGING APPARATUS FOR A TRANSFORMER

Masaaki Kagawa, Akira Watanabe, and Junichi Watanabe, Tokyo, Japan, assignors to Tokyo Shibaura Electric Co., Ltd., Kawasaki-shi, Japan, a corporation of Japan Filed Nov. 27, 1963, Ser. No. 326,593
2 Claims. (Cl. 323—43.5)

This invention relates to an improved tap changing apparatus and more particularly to an arcless tap changer for a transformer and the like.

Although this invention can be applied for any transformer or reactor provided with a number of taps, for the sake of description, a tap changing apparatus as applied to a transformer mounted on an alternating current electric vehicle will be explained in the following.

With recent progress in electric railway systems alternating current electric cars or locomotives have become widely used. Generally, in alternating current railway systems the cost of initial installation of machines and apparatus to be installed on the ground, such as those in substations is lower whereas the cost and size of the control apparatus mounted on the vehicle are higher when compared with direct current system. More particularly, in an alternating current railway car the speed of the car is controlled by varying the voltage applied to traction motors by changing taps of a main transformer mounted on the car, and it is necessary to increase the number of taps to decrease the voltage difference between adjacent taps in order to gradually and smoothly start and accelerate the car.

Most of the prior tap changers have employed a combination of a plurality of contacts having sufficient electric power interrupting ability which are operated in a predetermined sequence to interrupt the short circuit current flowing between adjacent taps when on-load tap changing is effected. With such a prior arrangement, the main switch, such as an air circuit breaker is operated to interrupt the motor current at each time when the tap changer operates from one tap to the next so that it is difficult to gradually and smoothly start the car. Moreover as the contacts of the tap changer switch are damaged by severe electric arc their usable life is short and requires large labor and cost of maintainance.

In order to eliminate the above mentioned disadvantages an arrangement has been proposed utilizing a mercury arc electric valve and mechanical switches wherein initiation and interruption of the current are effected by the electric valve and the mechanical switches are used to change electrical connections to different taps in no current condition. However, with such an arrangement use of a mercury arc electric valve results in the increase of the size and cost of the tap changing apparatus thus rendering it difficult to mount them in a narrow space available on a car or locomotive.

Accordingly, in prior alternating current electric cars, tap changers with mechanical contacts were generally used, but owing to frequent failure of such contacts due to electric arc, development of an arcless tap changing apparatus has long been desired.

Thus it is the principal object of this invention to provide an arcless tap changing apparatus for transformers and reactors.

Another object of this invention is to provide an arcless tap changing apparatus utilizing semiconductor switches such as silicon controlled rectifier elements.

A more specific object of this invention is to provide an improved tap changing apparatus particularly suitable for use in alternating current vehicles, which is small size and light weight and yet can provide gradual and smooth acceleration of the electric car.

Still a further object of this invention is to provide an improved method of changing taps of a transformer and the like which can substantially increase the effective number of voltage steps by using a given number of taps and semiconductor switches of relatively small capacity.

In accordance with this invention these and other objects are attained by providing an electric transformer including a winding provided with a plurality of voltage adjusting taps and connected to be energized from a source of alternating current, a load supplied with a variable voltage from said transformer, a plurality of first contactors each associated with one of said taps of said transformer winding to connect said one tap to said load, a pair of branch circuits each including a reactor winding and a second contactor for connecting alternate ones of said first contactors to said load, a third contactor connected across terminals of said reactor windings which are close to said transformer winding, said third contactor being arranged to be closed when one of said taps is selected but opened during tap changing operation, a pair of semiconductor switches connected in reverse parallel relation across the opposite terminals of said reactor windings to pass positive and negative half cycles, respectively of said alternating current when said second contactor is operated during tap changing operation.

According to the method of this invention a suitable controller is provided to effect the following sequential steps of connecting the first tap to the load through said pair of parallel branch circuits each including a reactor winding, disconnecting one of said branch circuits from said load and connecting it in parallel with the other branch circuit through said pair of semiconductor switches, turning off said semiconductor switches to disconnect said first branch circuit from said load, connecting said other branch circuit between the second tap and said load through said semiconductor switches while limiting the short circuit current flowing between said first and second taps by said reactor windings, connecting said other branch circuit directly to said load thereby to supply thereto a voltage intermediate of the voltages at said first and second taps, connecting said first branch circuit to said load through said semiconductor switches, disconnecting said first branch circuit from said first tap, connecting said first branch circuit in parallel with said second branch through said semiconductor switches and connecting said first branch circuit directly to said load thereby to energize it by the voltage at said second tap through said pair of branch circuits.

Thus, according to this invention taps can be changed without producing any objectional electric arc at various contactors and without actually interrupting the load circuit. Moreover, semiconductor switches of relatively small capacity can be utilized because they are required to carry the load current only during intervals during which the taps are changed.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawings, in which:

FIG. 2 shows a sequence table of the respective contactors of the tap changing apparatus shown in FIG. 1.

Figure 1:
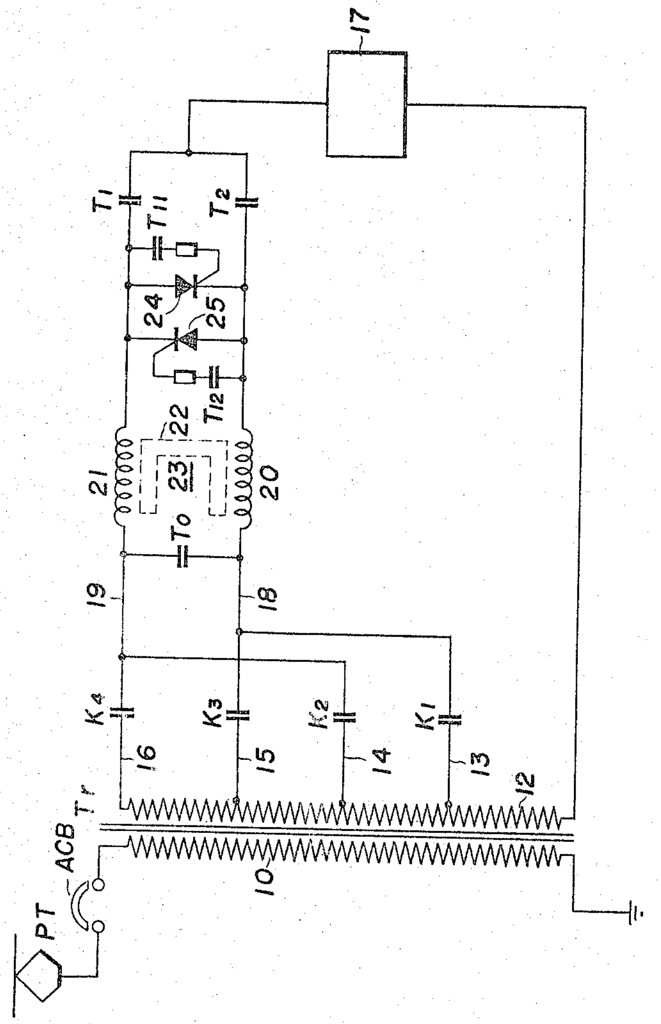
FIG. 1 shows a circuit diagram of an arcless tap changing apparatus constructed according to the principle of this invention.

Referring now to the accompanying drawings which illustrate one embodiment of this invention as applied to an alternating current locomotive, in FIG. 1 is shown a transformer Tr having a primary winding 10 with one terminal connected to a trolley wire via an air circuit breaker ACB and a pantograph PT and the other terminal grounded and a secondary winding 12 provided wtih a plurality of taps 13, 14, 15 and 16. A load 17, such as the traction motors of an electric vehicle, is connected across the secondary winding 12 to be supplied with a variable voltage through a tap changing arrangement embodying this invention to be explained hereinafter. Thus, each of the taps 13, 14, 15 and 16 is connected to one terminal of each of contactors $K_1$, $K_2$, $K_3$ and $K_4$ and the common junction between contacts $K_1$ and $K_3$ is connected to a conductor 18. Similarly, the right hand terminals of the contactors $K_2$ and $K_4$ are connected to a conductor 19. A pair of windings 20 and 21 wound upon a common magnetic core 22 of a reactor 23 are respectively connected in conductors 18 and 19. Between the left hand terminals of the reactor windings 20 and 21 which are close to the transformer taps is connected a contactor $T_0$ which is operated as will be explained later in more detail. Opposite terminals of the reactor windings 20 and 21 are connected to one terminal of the load 17 respectively through contactors $T_2$ and $T_1$ and the other terminal of the load is connected to the lower terminal of the transformer secondary winding 12. A pair of semiconductor switches, such as silicon controlled rectifiers 24 and 25 (hereinafter designated as SCR) are connected in parallel but with opposite polarities across conductors 18 and 19 between said reactor 23 and said contactors $T_1$ and $T_2$. As shown in the drawings, the gate electrode of the SCR 24 is connected to its anode via a contact $T_{11}$ while the gate electrode of the SCR 25 to its anode via a contact $T_{12}$.

The operation of the tap changing apparatus illustrated in the accompanying drawings is as follows: At first it is assumed that the load or traction motors 17 are to be connected to the lowest tap 13 of the secondary winding 12 to start them gradually. Although not shown in the drawings it should be understood that a suitable controller is provided for the electric vehicle for opening and closing contactors or contacts $K_1$, $K_2$, $K_3$, $K_4$, $T_0$, $T_1$, $T_2$, $T_{11}$ and $T_{12}$ according to a predetermined sequence as will be described hereinafter.

Figure 3:
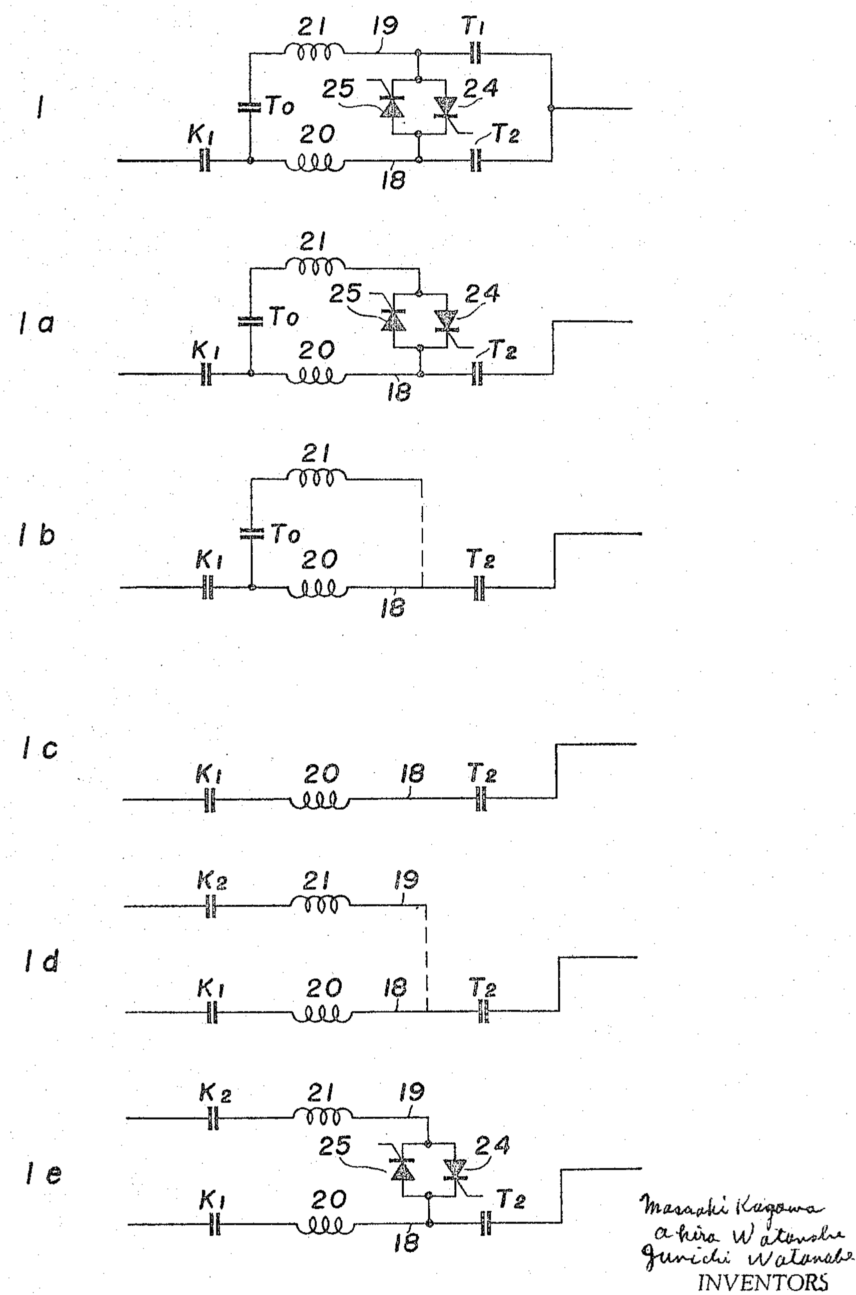
FIG. 3 shows various connections of a portion of FIG. 1 at the successive steps of tap changing operation.
Figure 3:
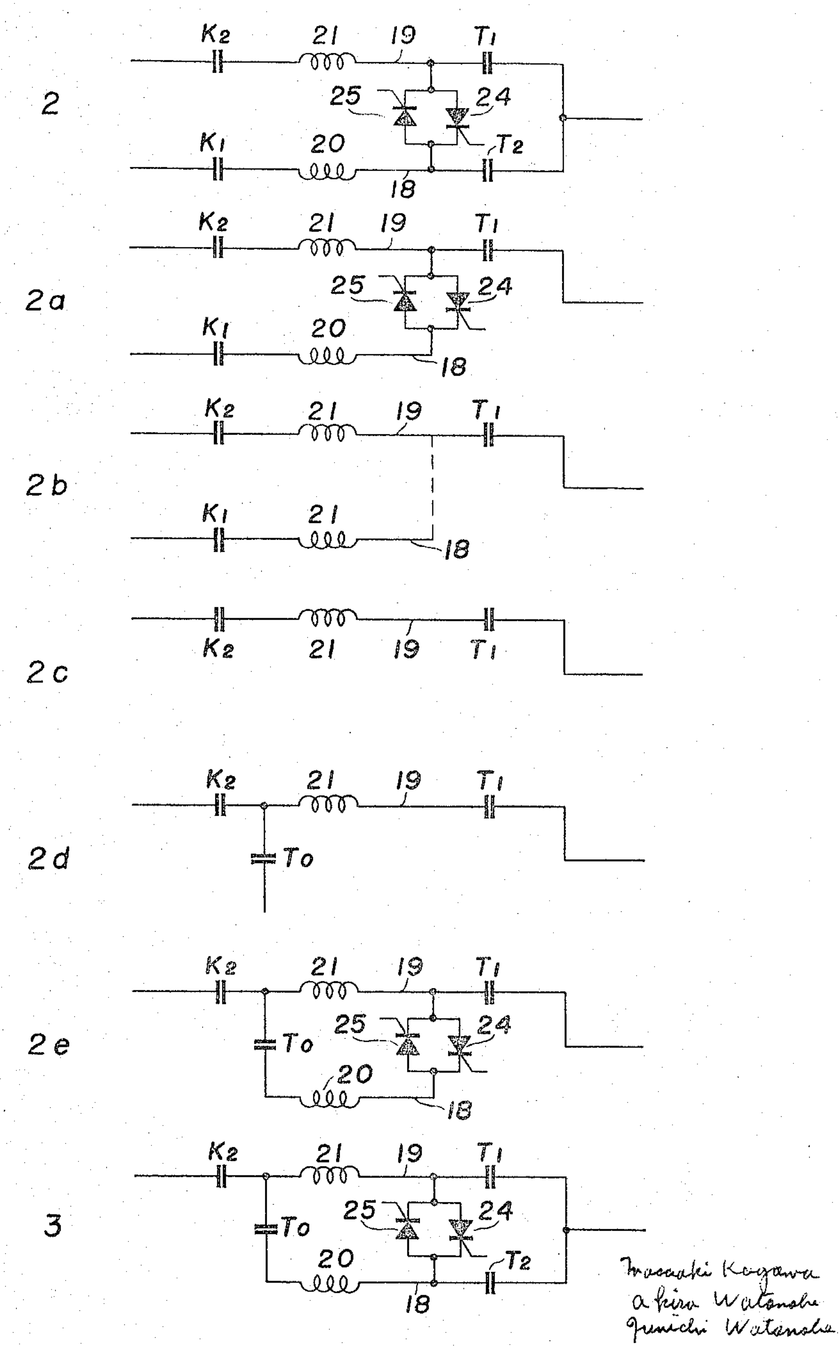

As shown by a sequence table of FIG. 2, when the controller is advanced to its first notch 1 contactors $K_1$, $T_0$, $T_1$, $T_2$, $T_{11}$ and $T_{12}$ are closed. At the same time the air circuit breaker ACB in the primary circuit of the transformer Tr is closed to energize it from the trolley wire. The circuit established at that time between the tap 13 and the load 17 is shown by FIG. 3–1. In this state all contactors are closed whereby the load current flows to the load through parallel branches, one including the contactor $T_0$, the conductor 19, the reactor winding 21 and the contactor $T_1$, and the other including the reactor winding 20, the conductor 18 and the contactor $T_2$. In this case, reactor windings 20 and 21 operate to equalize the amount of current flowing these branches, as is well known in the art. When advancing the controller from the first notch 1 to the second notch 2 of FIG. 2, it sequentially pases five positions 1*a* to 1*e* inclusive. In the position 1*a*, the contactor $T_1$ is opened as shown by FIG. 3—1*a*. If it is assumed that the contactor $T_1$ is opened during a positive half cycle of the voltage appearing at the tap 13, then a current will flow through the gate electrode of the SCR 24 thus turning it on. On the contrary if the contactor $T_1$ is opened during the negative half cycle the other SCR 25 will be turned on to by-pass the load current around the contactor $T_1$. In this manner, the contactor $T_1$ can be opened without producing any electric arc, and in this condition the load current is divided equally between two reactor windings through a pair of silicon controlled rectifiers 24 and 25.

At the end of the positive half cycle the SCR 24 turns off and similarly at the end of the negative half cycle the SCR 25 turns off. The current flowing through the branch including the contactor $T_0$, the reactor winding 21, the conductor 19 and the silicon controlled rectifiers 24 and 25 is reduced to zero whereby the contactor $T_0$ can be opened without accompanying any arcing. Thus, the controller is advanced from position 1*b* to 1*c* in FIG. 2 to open the contactor $T_0$. The connections at the respective controller positions 1*b* and 1*c* are schematically shown by FIGS. 3—1*b* and 1*c*. As shown by FIG. 3—1*c*, the load current then flows only through the branch including the contactors $K_1$, $K_2$ and the reactor winding 20. The controller is then advanced from the position 1*c* to 1*d* as shown in FIG. 2. Then, the contactor $K_2$ is closed to connect the reactor winding 21 to the second tap 14. However, this contactor $K_2$ can be closed without any arcing because both of the silicon controlled rectifiers 24 and 25 are in off condition. This condition is schematically shown by FIG. 3—1*d*. When the controller is advanced from the position 1*d* to the position 1*e* of FIG. 2, contactors $T_{11}$ and $T_{12}$ will be closed whereby gate currents are supplied to the silicon controlled rectifiers 24 and 25 during positive and negative half cycles, respectively, to turn them on. This condition is shown by FIG. 3—1*e*. The short circuit current flowing between taps 13 and 14 during this condition through the contactor $K_1$, conductor 18, reactor winding 20, silicon controlled rectifiers 24 and 25, conductor 19, reactor winding 21 and conductor 19 is reduced to a low value by the action of the reactor 23, whereas the voltage applied to the load 17 is increased to the mean value of those appearing at taps 13 and 14. The controller is then advanced from the position 1*e* to the second notch 2 of FIG. 2. Then the contactor $T_1$ will be closed to establish a circuit as shown in FIG. 3–2. Inasmuch as the forward voltage drop of silicon controlled rectifiers 24 and 25 is very small, the contactor $T_1$ can be closed without any arcing. Thus, it will be noted that at the second notch 2, a mean voltage of those appearing at the taps 13 and 14 is impressed upon the load 17.

In order to further increase the voltage supplied to the load until it becomes equal to the voltage of the tap 14, the following procedures are required. While such a voltage can be obtained at the third notch of FIG. 3, additional five steps or positions are necessary between notches 2 and 3. More particularly, as will be clear from the sequence table shown in FIG. 2, at the position 2*a*, the contact $T_2$ is opened to establish a circuit as shown by FIG. 3—2*a*. As already pointed out, as soon as the contactor $T_2$ is opened, silicon controlled rectifiers 24 and 25 will be turned on to permit the contactor $T_2$ to open without arcing. Movement of the controller from the position 2*a* to 2*b* of FIG. 2 will result in the opening of contactors $T_{11}$ and $T_{12}$ to turn off the silicon controlled rectifiers 24 and 25. As the result the branch through the conductor 18 is interrupted so that the load current will be supplied to the load 17 through the remaining branch including the contactor $K_2$, conductor 19, reactor winding 21 and the contactor $T_1$ as shown by FIG. 3—2*b*. Thus, the contactor $K_1$ can be opened without any arcing. In other words, by advancing the controller from the position 2*b* to the position 2*c*, the contactor $K_1$ will be opened to establish a circuit as shown by FIG. 3—2*c* to feed the load 17 under higher voltage supplied from the tap 14 via the contactor $K_2$, conductor 19, reactor winding 21 and the contactor $T_1$. At this time the contactor $T_0$ can be closed without any arcing at the position 2*d* of FIG. 2 to establish a circuit as shown by FIG. 3—2*d*. Then the controller is further advanced to the position 2*e* to close the contacts $T_{11}$ and $T_{12}$ in the gate electrode of SCR, thus establishing a circuit indicated by FIG. 3—2*e*. Thus, the silicon controlled rectifiers 24 and 25 will be turned on to equally divide the load current between reactor windings 20 and 21. Thereafter, the controller is advanced to the notch 3 to close the contactor $T_2$ to short circuit the silicon controlled rectifiers by means of the contactors $T_1$ and $T_2$. Thus, normally these rectifiers do not carry large load current and the voltage impressed upon the load 17, that is, the traction motors are increased to the voltage at the tap 14.

The process of changing the connection from tap 14 to tap 15 for further increasing the load voltage is shown by the steps from the notches 3 to 5 of the sequence table shown in FIG. 2, the sequence of opening and closing various contactors being the same as described above in connection with FIG. 3. Similarly when the controller is advanced from the notches 5 to 7 through the notch 6, the connection will be changed from the tap 15 to 16, thus applying higher voltage to the load.

For reducing the load voltage or decelerating the vehicle, the controller is returned from the highest notch 7 or any intermediate notch back to the first notch 1. Then various contactors will be operated in a sequence just opposite to that described above in connection with acceleration to decrease the load voltage to that of the tap 13. When the contactor is returned to the off position, the main circuit breaker ACB is tripped to interrupt the load circuit.

From the above description it will be clear that this invention provides a novel tap changing apparatus which has relatively simple construction, long operating life with minimum cost of maintenance and can operate various contactors or contacts without producing any harmful electric arc for changing transformer taps. In order to operate the contactors in a tap changing circuit without arcing, heretobefore it has been the practice to open the main circuit breaker ACB or a circuti breaker provided at the terminal of the load, but in such a load as electric vehicles, the motor current is interrupted, thus causing large shock whenever the circuit breaker is opened. On the contrary, since in accordance with this invention the circuit breaker ACB is operated only for the initial closure of the load circuit and final interruption thereof and is not operated for effecting tap changing it will be obvious that the electric vehicles can be accelerated or decelerated very smoothly. Moreover, semiconductor switches are required to carry the load current only during short intervals at the time of tap changing so that semiconductor switches of relatively small capacity and hence of low cost can be used.

While this invention has been described in connection with a preferred embodiment thereof it will be understood that various changes and modifications will occur to those skilled in the art without departing from the true spirit and scope of the invention as defined by the appended claims.

What is claimed is:

1. Tap changing apparatus comprising a combination of an electric transformer including a winding provided with a plurality of voltage adjusting taps and connected to be energized from a source of alternating current, a load supplied with a variable voltage from said transformer, a plurality of first contactors each associated with one of said taps of said transformer winding to connect said one tap to said load, a pair of branch circuits each including a reactor winding and a second contactor for connecting alternating ones of said first contactors to said load, a third contactor connected across terminals of said reactor windings which are close to said transformer winding, said third contactor being arranged to be closed when one of said taps is selected but opened during tap changing, a pair of semiconductor switches connected in reverse parallel relation across the opposite terminals of said reactor windings to pass positive and negative half cycles, respectively of said alternating current when said second contactors are operated during tap changing operation.

2. Method of changing taps of a transformer having a plurality of taps comprising the steps of connecting the first tap to a load through a pair of parallel branch circuits each including a reactor winding, disconnecting one of said branch circuits from said load and connecting it in parallel with the other branch circuit through a pair of semiconductor switches which are connected in parallel but in opposite polarities, turning off said first branch circuit from said load, connecting said other branch circuit between the second tap and said load through said semiconductor switches while limiting the short circuit current flowing between said first and second taps by said reactor windings, connecting said other branch circuit directly to said load thereby to supply to said load a voltage intermediate of the voltages at said first and second taps, connecting said first branch circuit to said load through said semcionductor switches, disconnecting said first branch circuit from said first tap, connecting said first branch circuit in parallel with said second branch circuit through said semiconductor switches and connecting said first branch circuit directly to said load thereby to energize it by the voltage at said second tap through said pair of branch circuits.

References Cited by the Examiner

UNITED STATES PATENTS

| | | | |
|---|---|---|---|
| 3,176,189 | 3/1965 | Tabet | 323—22 X |
| 3,195,038 | 7/1965 | Fry | 323—25 |
| 3,263,157 | 7/1966 | Klein | 323—22 |

FOREIGN PATENTS

| | | |
|---|---|---|
| 1,240,583 | 8/1960 | France. |
| 827,722 | 2/1960 | Great Britain. |

JOHN F. COUCH, *Primary Examiner.*

W. E. RAY, *Assistant Examiner.*